Patented Aug. 29, 1933

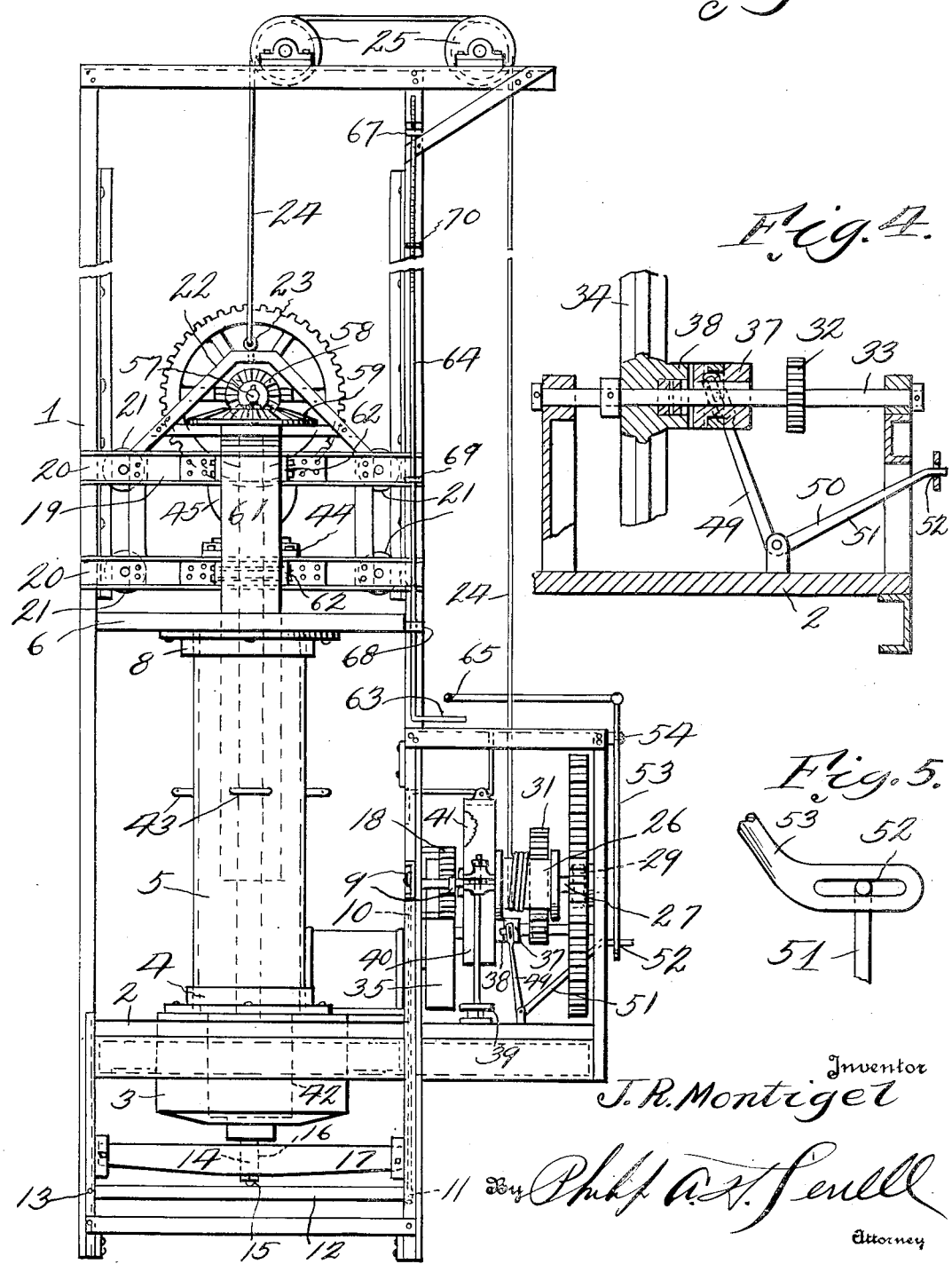

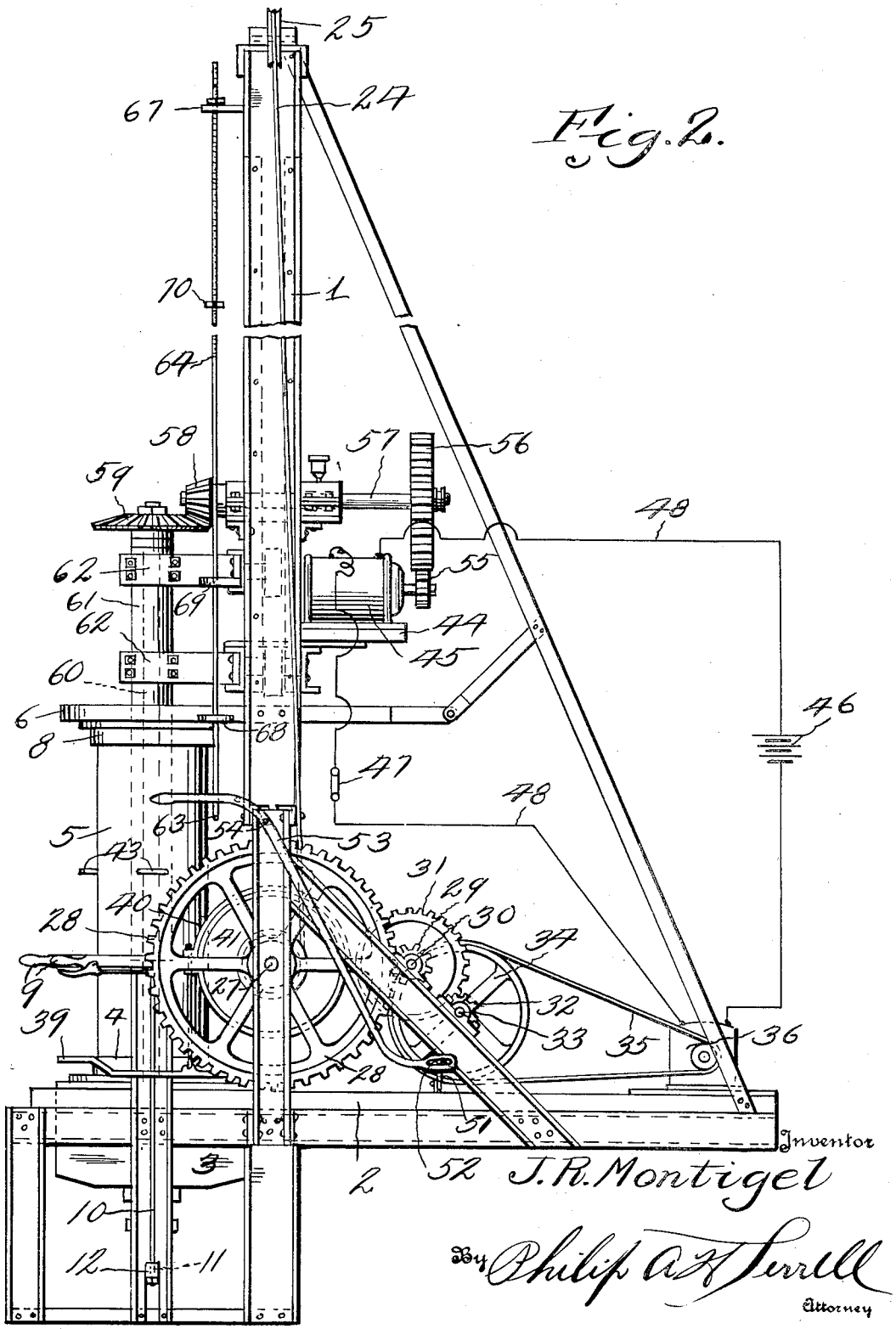

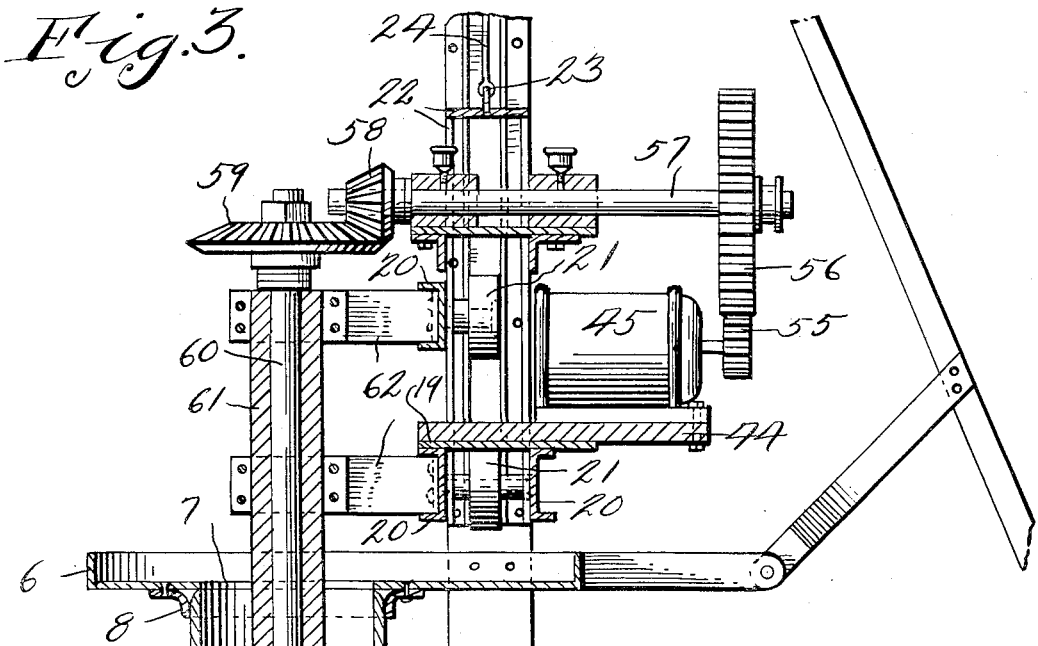
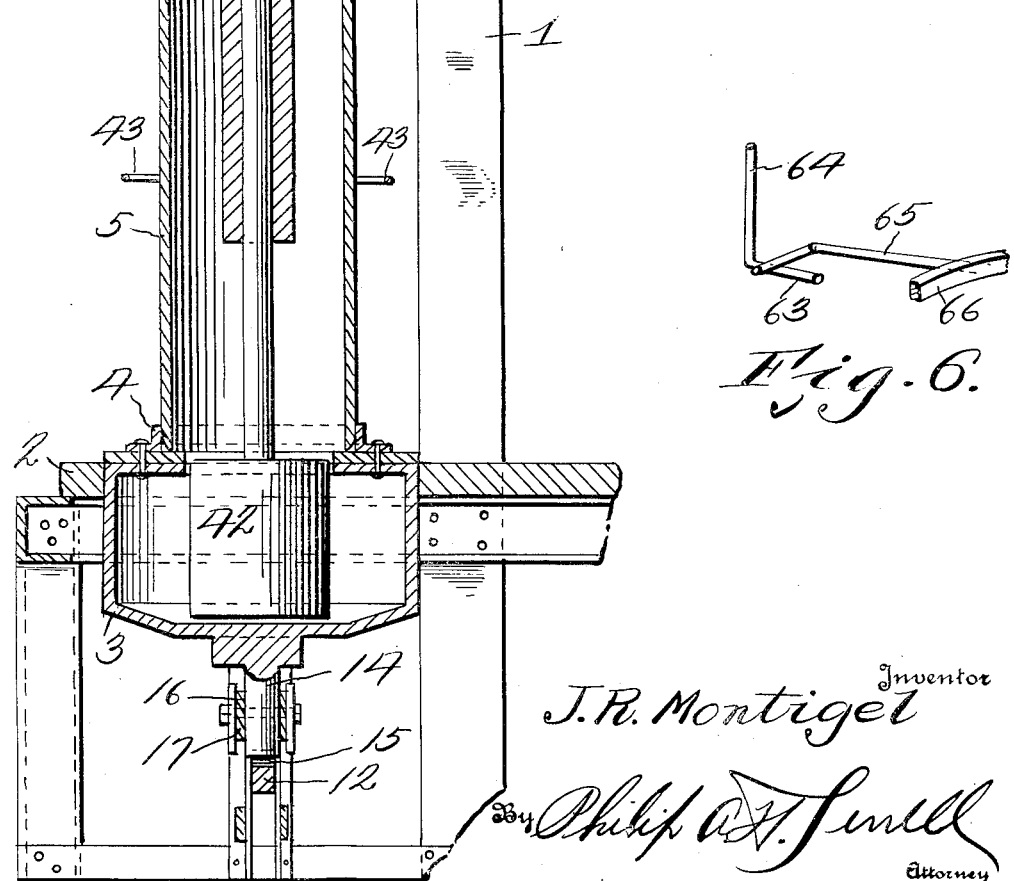

1,924,798

UNITED STATES PATENT OFFICE 1,924,798

PLASTIC PIPE FORMING MACHINE

James R. Montigel, Redlands, Calif.

Application January 12, 1931. Serial No. 508,260

3 Claims. (Cl. 25—36)

The invention relates to machines for forming plastic pipes, and has for its object to provide a device of this character, in which successive pipe jackets may be placed, and means whereby a rotatable head or packer may be moved axially through the jacket in spaced relation to the inner periphery thereof, simultaneously with the feeding of plastic material into the jacket. The head packing the plastic material during its rotation and axial movement, thereby forming a plastic pipe section.

A further object is to provide means whereby additional revolutions may be imparted to the head while standing still axially, thereby applying an additional packing to the material at the finished end of the pipe section.

A further object is to provide a supporting table for the jackets or moulds, a mud pan above the table, a holder on the table for receiving the lower end of the jacket, a holder on the under side of the mud pan and means whereby said table may be moved for forcing the upper end of the jacket into mud pan holder. Also to provide an opening through the mud pan through which mud may be discharged into the jacket.

A further object is to provide a vertically movable elevator within the frame having a motor mounted thereon for driving the packet head; a separate motor having driving connection with a rotatable drum and cable connections between the rotatable drum and the elevator, whereby said elevator may be raised for the traversing operation. Also to provide clutch means whereby said elevator may be allowed to move by gravity to its lower position and raise by power through the cable connection.

A further object is to provide automatic stop means controlled by the elevator for stopping the hoisting motor when the elevator reaches its upper raised position.

A further object is to provide a slidably mounted member supported on the table and carrying the jacket holder and lever means cooperating with an extension of the slidably mounted member whereby it may be raised in relation to the table for holding the upper end of the jacket in the jacket holder carried by the mud pan.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the pipe forming machine.

Figure 2 is a side elevation of the pipe forming machine.

Figure 3 is a vertical longitudinal sectional view through the elevating carriage mould jacket and table.

Figure 4 is a vertical transverse sectional view through a portion of the hoisting mechanism showing the clutch.

Figure 5 is a detail view of the connection between the clutch control levers.

Figure 6 is a detail perspective view of the lower end of the clutch releasing rod and the arm carried by the clutch control lever.

Referring to the drawings, the numeral 1 designates the frame of the machine, which frame is provided with a table 2 in which is slidably mounted, for vertical movement the mould supporting member 3, which member, on its upper end, is provided with an annular flange 4 adapted to receive therein the lower end of the mould 5, so that the mould will be forced upwardly upon upward movement of the member 3. Supported by the frame 1 above the table 2 is a mud pan 6, which is horizontally disposed, and is provided with a mud discharge opening 7, surrounded by the mould receiving flange 8 on the under side of the pan, and through which opening 7, mud is forced by the operator for deposit within the mould 5 during the pipe forming operation hereinafter set forth. The operator places the mould within the flange 4 and then grips the lever 9 and forces the same upwardly, which action imparts a pull on the rod 10, the lower end of which is connected at 11 to a transversely disposed pivoted lever 12, the other end of which is pivotally connected at 13 to the opposite side of the frame. Mould supporting member 3 is provided with a downwardly extending shaft 14, the lower end of which terminates in an antifrictional bearing 15, which rests on the upper side of the lever 12, therefore it will be seen that when the free end of the lever 12 is forced upwardly, member 3 will be raised for forcing the mould 5 upwardly to a position where its upper end will be received within the annular flange 8 on the under side of the stationary mud pan 6. Shaft 14 is slidably mounted in a bearing 16 of a transverse brace bar 17, therefore it will be seen that the member 3 is accurately guided in its upward and downward movement.

When the lever 9 is forced upwardly, it may be held in raised position by cooperation with a conventional form of rack 18, therefore the mould is rigidly held within the flanges 4 and 8. Slidably mounted within the upper end of the frame 1 is a vertically movable carriage 19, which carriage comprises bars 20 engaging opposite sides of the frame and pivotally mounted between the bars are rollers 21, thereby materially reducing the friction, in the upward and downward movement of the carriage. The carriage is provided with an upwardly extending bracket 22, to which is connected at 23 a cable 24 for raising and lowering the carriage. Cable 24 extends upwardly over the spaced pulleys 25, thence downwardly and around a conventional form of drum 26, which drum is carried by a transverse shaft 27. Shaft 27, at its outer end is provided with a gear 28, with which a small drive pinion 29 meshes. Drive pinion 29 is carried by a transverse shaft 30, having a larger gear 31, which in turn meshes with a small pinion 32 carried by a pulley shaft 33, therefore it will be seen when the pulley shaft 33 is rotated by a pulley 34 through the medium of a belt connection 35, with a conventional form of motor 36, there is a gear train drive connection with the shaft 27 and the drum 26; therefore it will be seen that the cable 24 will wind around the drum and raise the carriage 19. Shaft 33 has slidably keyed thereon a clutch element 37 which cooperates with a clutch 38 carried by one side of the pulley 34, which is rotatably mounted on the shaft 33, therefore it will be seen that when the clutch elements are out of cooperative engagement, the driving connection between the motor 36 and the drum 26 will be broken, consequently the carriage 19 will remain stationary.

To hold the carriage 9 in any particular range of position, after the declutching of clutch elements 37 and 38, the operator places his foot on the foot pedal 39, which controls a conventional form of brake band 40, which extends around a brake drum 41 carried by the shaft 27. This is of particular importance, as it is desirable when the rotatable pipe forming head 42 reaches the upper end of the mould 5, to continue rotation without the traversing operation for packing the material at the upper end of the pipe. The mould is preferably provided with hand grips 43 adapted to be grasped by the operator for placing a mould in position and removing the same, after a pipe forming operation.

Carriage 19 is provided with a platform 44 on which is mounted an electric motor 45, which moves with the carriage, however motors 45 and 36 are preferably connected in series with each other and with the battery 46 and a switch 47, therefore it will be seen that when the circuit over the wires 48 is closed, by the operator manipulating the switch 47, both motors will start. At the starting operation the rotatable head 42 is in its lower position within the member 3 and it immediately starts to rotate the mechanism hereinafter set forth, but the carriage is held in its lower position by the brake band 40 and foot pedal 39 and the clutch elements 37 and 38 are in declutched relation, therefore the drum 26 will not be rotated. Clutch element 37 is controlled by the arm 49 of the bell crank lever 50, the arm 51 of which extends outwardly and has a slidable connection at 52 with the clutch lever 53, which is pivotally connected at 54 to the side of the frame.

The motor 45 mounted on the carriage and movable with the carriage has a drive pinion 55 which meshes with a pinion 56 carried by the shaft 57, and which shaft extends forwardly and terminates in a bevelled gear 58 which meshes with a bevelled gear 59, carried by the upper end of the downwardly extending head carrying shaft 60, on the lower end of which the head 42 is mounted. Shaft 60 rotates in a sleeve 61 rigidly supported on the carriage arm 62, therefore it will be seen that as the carriage is moved upwardly by the cable 24 for causing the rotatable head 42 to traverse the mould 5, said head will rotate. In operation the head is in its lower position at the starting of the pipe forming operation; however the head 42 is simultaneously rotated and raised within the mould, and during which operation, the operator feeds mud from the mud pan 6 through the opening 7 into the mould, consequently the rotatable head 42 will form a hollow pipe within the mould 5. This operation continues until the rotatable head 42 reaches a position where it is about to leave the upper end of the mould. At this point it is desirable to continue the rotation of the head without its moving upwardly so as to pack the mud at the upper end of the pipe, and to accomplish this result, it is necessary to stop the rotation of the drum 26. This is accomplished by means of the horizontal arm 63 of the adjustable rod 64 engaging the angularly shaped arm 65 carried by the clutch lever 66 for the declutching operation. Rod 64 is adjustably supported in a bracket 67 carried by the frame 1 adjacent its upper end, and which rod is also slidably mounted in a stationary lug 68 carried by the mud pan 6.

As the carriage 19 reaches a predetermined position in its upward movement, the lug 69, through which the rod 64 also extends, engages the adjustable stop nut 70, which will cause the declutching operation of clutch elements 37 and 38. The motors will continue to run, and the motor 45 will continue to rotate the head 42 for the pipe finishing operation without the upward movement of the head.

After the pipe forming operation, lever 9 is released which will allow the member 3 to move downwardly by gravity to a position where the mould 5 may be removed for the reception of another mould, and after another mould is in position the rotatable head 42 is lowered by the downward movement of the carriage 19 under the force of gravity, and under the control of the foot lever 39.

From the above it will be seen that a pipe forming machine is provided, which is simple in construction, positive in its operation and one wherein the parts are reduced to a minimum.

The invention having been set forth what is claimed as new and useful is:—

1. A machine for forming plastic pipes comprising a frame, a mold receiving member carried by the frame, a carriage vertically movable in the frame above the mold receiving member, means carried by the frame for raising and lowering the carriage, a rotatable packer head carried by the carriage and axially movable through the mold and the mold holder, means for rotating the packer head, a lever controlling the carriage raising and lowering means, a stop mechanism whereby said packer head will be stopped in its vertical movement with the carriage when it reaches the upper end of the mold, said stop mechanism comprising a vertically movable rod carried by the frame, an adjustable stop on said rod, a member carried by the carriage and cooperating with said stop for raising the rod at a predetermined position, a member carried by the carriage control mechanism lever, and a member carried by the rod and extending into the path of said lever member whereby said lever will be rocked upon upward movement of the rod with the carriage.

2. The combination with a pipe forming machine comprising a stationary frame, a mold, a movable carriage, means carried by said carriage for driving a packer head extending downwardly axially into the mold, lever control means for raising and lowering said carriage, of a stop mechanism whereby said packer head in its upward movement will be stopped in its axial movement and allowed to rotate as it leaves the mold, said stop mechanism comprising a vertically movable rod carried by the frame, an adjustable stop carried by the rod, a member carried by the carriage in the path of the stop adapted to engage the stop and raise the rod, said rod having a member in the path of the control lever and positioned whereby it will operate said lever when the packer head reaches upper end of the mold and stop the upward movement thereof.

3. The combination with a machine for forming plastic pipes in a mold, of a mold holder, said mold holder comprising a horizontal stationary tray, a mold receiving member on the under side of said tray and adapted to receive the upper end of a mold, a mold holding member below the tray and adapted to receive the lower end of a mold, of means for moving said vertically movable mold holding member upwardly and downwardly for receiving and releasing the mold, said means comprising a transverse bar beneath the mold holding member, a shaft carried by the mold holding member and extending downwardly through the bar, a transverse lever beneath the bar, one end of said lever being pivoted at one side of the machine, the other end of said lever being provided with means whereby it may be moved upwardly and downwardly, said lever engaging the downwardly extending member below the transverse bar and forming means whereby said last named mold holding member may be raised or lowered.

JAMES R. MONTIGEL.